(12) United States Patent
Takahashi et al.

(10) Patent No.: US 10,919,050 B2
(45) Date of Patent: Feb. 16, 2021

(54) CENTRIFUGE THAT OBTAINS AN ACCELERATION VALUE AND CONTROLS ROTATION

(71) Applicant: KUBOTA MANUFACTURING CORPORATION, Tokyo (JP)

(72) Inventors: Yuya Takahashi, Gunma (JP); Chitoshi Miki, Gunma (JP)

(73) Assignee: KUBOTA MANUFACTURING CORPORATION, Tokyo (JP)

( * ) Notice: Subject to any disclaimer, the term of this patent is extended or adjusted under 35 U.S.C. 154(b) by 344 days.

(21) Appl. No.: 15/772,647

(22) PCT Filed: Jul. 26, 2016

(86) PCT No.: PCT/JP2016/071827
§ 371 (c)(1),
(2) Date: May 1, 2018

(87) PCT Pub. No.: WO2017/085965
PCT Pub. Date: May 26, 2017

(65) Prior Publication Data
US 2019/0134646 A1  May 9, 2019

(30) Foreign Application Priority Data
Nov. 16, 2015 (JP) .............................. JP2015-223610

(51) Int. Cl.
*B04B 9/14* (2006.01)
*B04B 9/10* (2006.01)
(Continued)

(52) U.S. Cl.
CPC ................ *B04B 9/146* (2013.01); *B04B 5/02* (2013.01); *B04B 5/04* (2013.01); *B04B 9/10* (2013.01); *G01P 15/18* (2013.01)

(58) Field of Classification Search
CPC .. B04B 9/146; B04B 5/04; B04B 5/02; B04B 9/10; G01P 15/18
(Continued)

(56) References Cited

U.S. PATENT DOCUMENTS

2005/0007046 A1  1/2005  Schneider et al.
2005/0079064 A1  4/2005  Shimizu et al.
(Continued)

FOREIGN PATENT DOCUMENTS

CN          101173878 A       5/2008
CN          203396545 U    *  1/2014
(Continued)

OTHER PUBLICATIONS

CN 203396545 Description Espacenet Machine Translation.*
(Continued)

*Primary Examiner* — Walter D. Griffin
*Assistant Examiner* — Shuyi S. Liu
(74) *Attorney, Agent, or Firm* — Greenblum & Bernstein, P.L.C.

(57) ABSTRACT

Accurate measurement of acceleration caused by imbalance in the balance of a rotor is realized even in high-speed rotation with an acceleration sensor which has a processing speed required in low-speed rotation and a control unit. A centrifuge according to the present invention includes a rotor, a drive source for rotating the rotor, a rotating shaft for coupling the rotor and the drive source, an acceleration sensor, and a control unit. The acceleration sensor outputs values indicating acceleration in two different directions which are perpendicular to an axial direction of the rotating shaft. The control unit obtains an acceleration corresponding value, which is a value corresponding to acceleration in a direction perpendicular to the axial direction of the rotating shaft, based on values indicating acceleration in the two
(Continued)

different directions and stops rotation of the rotor in a case where the acceleration corresponding value satisfies a determination criteria.

6 Claims, 5 Drawing Sheets

(51) Int. Cl.
*G01P 15/18* (2013.01)
*B04B 5/04* (2006.01)
*B04B 5/02* (2006.01)

(58) Field of Classification Search
USPC .................. 494/1, 4, 9, 10, 12, 82
See application file for complete search history.

(56) References Cited

U.S. PATENT DOCUMENTS

2014/0087866 A1 3/2014 Schlusselberger et al.
2017/0328804 A1* 11/2017 Eberle ...................... B04B 9/12

FOREIGN PATENT DOCUMENTS

| | | |
|---|---|---|
| CN | 203396545 U | 1/2014 |
| CN | 103703499 A | 4/2014 |
| CN | 104457965 A | 3/2015 |
| DE | 102007042488 | 3/2009 |
| EP | 3218113 | 9/2017 |
| JP | S60-154134 A | 8/1985 |
| JP | 2002-306989 A | 10/2002 |
| JP | 2005-111402 A | 4/2005 |
| JP | 2009-039630 A | 2/2009 |
| JP | 2015-136689 A | 7/2015 |

OTHER PUBLICATIONS

International Search Report in WIPO Patent Application No. PCT/JP2016/071827 dated Nov. 1, 2016.
Office Action issued in China family member Patent Appl. No. 201680065773.5, dated Jul. 22, 2019, along with an English translation thereof.
Office Action issued in EPO family member Patent Appl. No. 16865968.8, dated Jul. 25, 2019.

* cited by examiner

CENTRIFUGE THAT OBTAINS AN ACCELERATION VALUE AND CONTROLS ROTATION

TECHNICAL FIELD

The present invention relates to a centrifuge which detects an imbalanced state and controls rotation.

BACKGROUND ART

In a rotor in a state in which a sample is placed, a state is generally generated in which the center of gravity of the entire rotor including the sample is not on a rotating shaft. Hereinafter, such state is referred to as imbalance in the balance. If this imbalance becomes too large, a rotor, a rotating shaft, and the like excessively vibrate, causing a breakdown of a centrifuge. As a technique for detecting such vibration caused by imbalance, Patent Literature 1, for example, is known.

PRIOR ART LITERATURE

Patent Art Literature

Patent Literature 1: Japanese Patent Application Laid Open No. 2002-306989

SUMMARY OF THE INVENTION

Problems to be Solved by the Invention

However, in the related art, acceleration which is caused by imbalance in the balance of a rotor and which can be measured by an acceleration sensor depends on time as $$R\omega^2 \sin \omega t \tag{1},$$

where R denotes an amplitude of vibration (deviation from an original position), $\omega$ denotes an angular velocity of rotation, and t denotes time (sec),
and a frequency is $\omega/2\pi$. Accordingly, from the sampling theorem, unless acceleration is sampled at a frequency of $\omega/\pi$ or higher, the amplitude R of vibration cannot be accurately obtained. For example, in the case of rotation at 12000 rpm, sampling at 400 Hz or higher (intervals of 2.5 msec or less) is required. Thus, an acceleration sensor for centrifuge which is capable of high-speed rotation is primarily required to have a high sampling frequency rather than to exhibit high accuracy, and a control unit which processes an output of the acceleration sensor is required to exhibit a high processing speed. Meanwhile, as can be seen from Formula (1), acceleration is proportional to the square of an angular velocity, so that the acceleration is very small when the angular velocity is low. Accordingly, it is difficult to obtain sufficient measurement accuracy when the angular velocity is low. Therefore, due to the difficulty in obtaining sufficient measurement accuracy, there is a possibility of malfunction of an occurrence of stop at low angular velocity even in the case where imbalance in the balance is within an allowable range and there is a possibility that imbalance exceeding the allowable range cannot be detected until the angular velocity becomes high, in practice.

An object of the present invention is to make it possible to accurately measure acceleration caused by imbalance in the balance of a rotor irrespective of the velocity of rotation of a rotor.

Means to Solve the Problems

A centrifuge according to the present invention includes a rotor, a drive source for rotating the rotor, a rotating shaft for coupling the rotor and the drive source, an acceleration sensor, and a control unit. The acceleration sensor outputs values indicating acceleration in two different directions which are perpendicular to an axial direction of the rotating shaft. The control unit obtains an acceleration corresponding value, which is a value corresponding to acceleration in a direction perpendicular to the axial direction of the rotating shaft, based on values indicating acceleration in the two different directions of the rotor in a case where the acceleration corresponding value satisfies a determination criteria which is predetermined and indicates that acceleration is large.

Effects of the Invention

According to the centrifuge of the present invention, a value corresponding to acceleration in a direction perpendicular to an axial direction of a rotating shaft can be obtained even without taking into account a sampling frequency, so that an acceleration sensor can be selected while giving priority to measurement accuracy. Accordingly, acceleration caused by imbalance can be measured with high accuracy irrespective of the velocity of rotation of a rotor.

DETAILED DESCRIPTION OF THE EMBODIMENT

Figure 1:
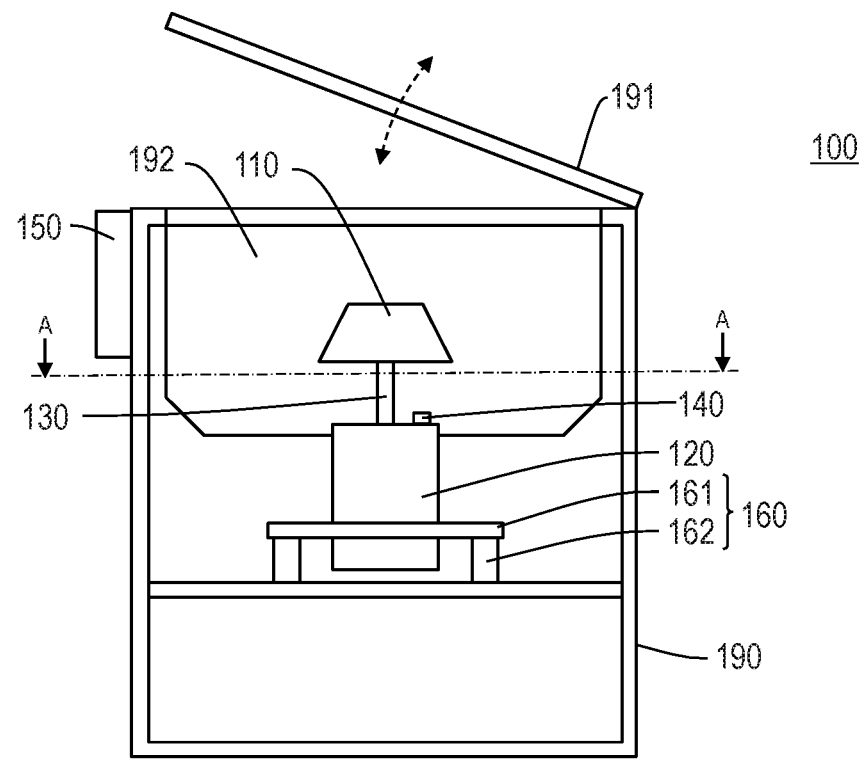
FIG. 1 is a diagram illustrating a configuration example of a centrifuge according to the present invention.

An embodiment of the present invention will be detailed below. Here, components having the same function will be given the same reference numerals and duplicate description thereof will be omitted.

First Embodiment

FIG. 1 illustrates a configuration example of a centrifuge according to the first embodiment. A centrifuge 100 includes a casing 190, a chamber 192, a chamber lid 191 which is freely openable and closable, a rotor 110 which is accommodated in the chamber 192, a drive source 120 which rotates the rotor 110, a rotating shaft 130 which couples the rotor 110 and the drive source 120, an acceleration sensor 140, a control unit 150, and a vibration isolation unit 160.

Figure 2:
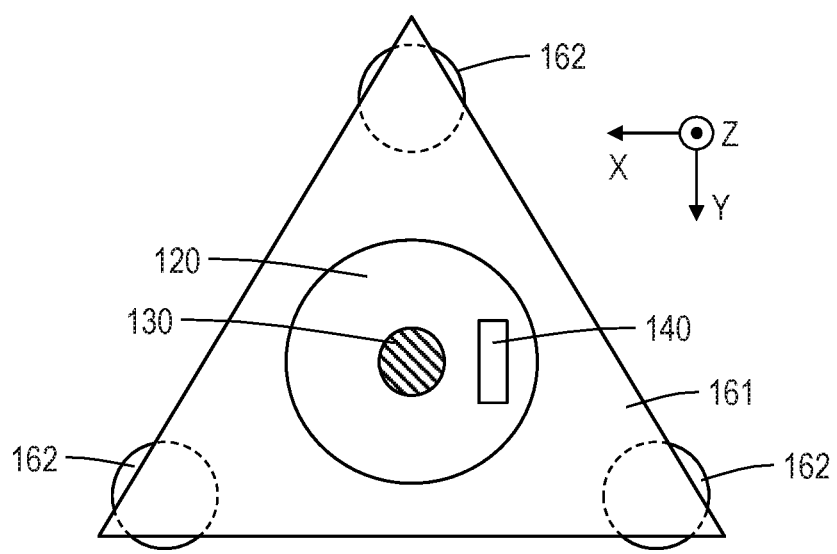
FIG. 2 is a diagram illustrating a drive source 120, a rotating shaft 130, an acceleration sensor 140, and a vibration isolation unit 160 when taken along line A-A in FIG. 1.
Figure 3A:
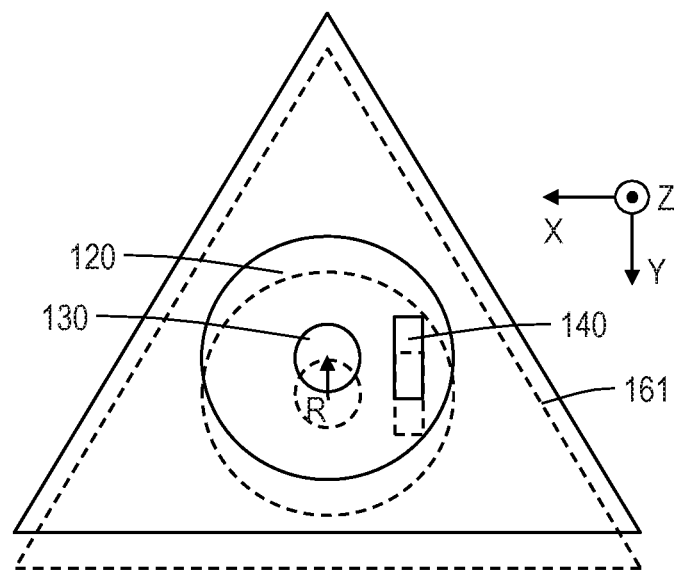
FIG. 3A is a first diagram illustrating a state that the drive source 120, the rotating shaft 130, the acceleration sensor 140, and the vibration isolation unit 160 vibrate.
Figure 3B:
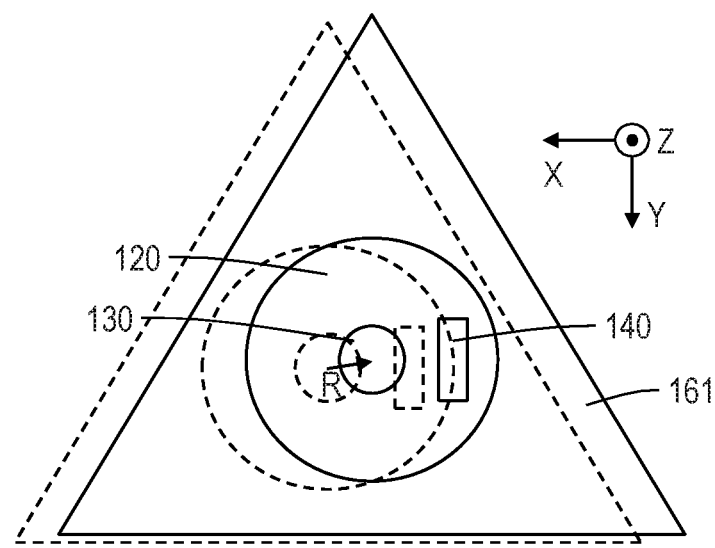
FIG. 3B is a second diagram illustrating a state that the drive source 120, the rotating shaft 130, the acceleration sensor 140, and the vibration isolation unit 160 vibrate.
Figure 3C:
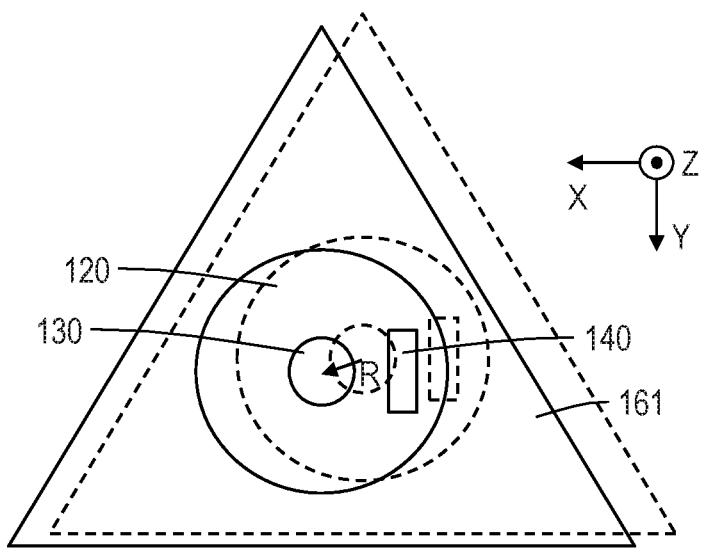
FIG. 3C is a third diagram illustrating a state that the drive source 120, the rotating shaft 130, the acceleration sensor 140, and the vibration isolation unit 160 vibrate.

FIG. 2 is a diagram illustrating the drive source 120, the rotating shaft 130, the acceleration sensor 140, and the vibration isolation unit 160 when taken along line A-A in FIG. 1. FIG. 3A, FIG. 3B, and FIG. 3C are diagrams illustrating a state that the drive source 120, the rotating shaft 130, the acceleration sensor 140, and the vibration isolation unit 160 vibrate. Positions indicated by dotted lines in FIG. 3A, FIG. 3B, and FIG. 3C are the original positions and states of being shifted in different directions are respectively illustrated.

As the rotor 110, there are a type having a hole for accommodating a test tube or the like, a type for attaching a bucket, which accommodates a tube rack for placing a sample, to the rotor 110, and the like. However, the type of the rotor 110 is not limited because the present invention is applicable regardless of the type of the rotor 110. The vibration isolation unit 160 serves to attenuate vibration generated by imbalance in the balance of the rotor 110. For example, the vibration isolation unit 160 may be composed of a support plate 161 gripping the drive source 120 and a plurality of vibration isolation springs 162 having one end fixed to the casing 190 and the other end fixed to the support plate 161, as illustrated in FIGS. 1 and 2.

The acceleration sensor 140 outputs values indicating acceleration in two different directions which are perpendicular to an axial direction of a rotating shaft. For example, the acceleration sensor 140 may be attached to an upper surface of the drive source 120, as illustrated in FIGS. 1 and 2. In the first embodiment, the two directions are perpendicular to each other, in which one is referred to as the X axis direction and the other is referred to as the Y axis direction. In addition, the axial direction of the rotating shaft 130 is defined as the Z axis direction. Further, a value indicating acceleration in the X axis direction is denoted as $a_X$ and a value indicating acceleration in the Y axis direction is denoted as $a_Y$. Here, the "value indicating acceleration" includes not only a value matching with the acceleration but also a value proportional to the acceleration and a value discretely indicating a value proportional to the acceleration such as a digital signal.

Since $a_X$ and $a_Y$ which are outputs from the acceleration sensor 140 of the first embodiment are values indicating acceleration in directions orthogonal to each other, when $$a_Y = R\omega^2 \sin \omega t \quad (2)$$

can be expressed, $$a_X = R\omega^2 \sin(\omega t \pm \pi/2) = \pm R\omega^2 \cos \omega t \quad (3)$$

can be expressed in theory. Here, a sign of $a_X$ is positive when a phase of $a_X$ is advanced by $\pi/2$ from a phase of $a_Y$ and is negative when the phase of $a_X$ is delayed. Which phase advances depends on a way of determining a positive direction of the X axis and the Y axis and a direction of rotation.

Figure 4:
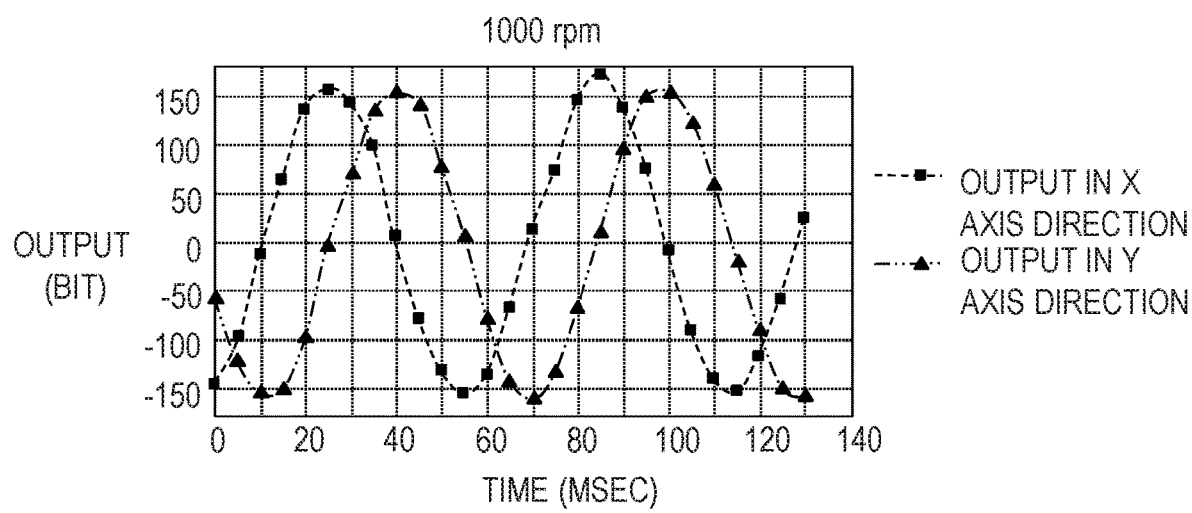
FIG. 4 is a diagram illustrating an example in which a rotor is rotated at 1000 rpm and values indicating acceleration generated by vibration are measured at intervals of 5 msec.

FIG. 4 illustrates an example in which a rotor is rotated at 1000 rpm and values indicating acceleration generated by vibration are measured at intervals of 5 msec. In this example, the vertical axis indicates the number of bits of a digital signal which is an output of an acceleration sensor. This number of bits corresponds to the "value indicating acceleration" mentioned above. Here, the negative number of bits indicates the number of bits of the case where a bit indicating a sign indicates negative. Points marked with squares and triangles are measured points and a dotted line and a two-dot chain line are lines connecting the measured points. In this example, the phase of the value $a_X$ indicating acceleration in the X axis direction is advanced by $\pi/2$ from the phase of the value $a_Y$ indicating acceleration in the Y axis direction. From FIG. 4, it can be seen that the amplitude of the value indicating acceleration is approximately 160. This value is a value corresponding to $R\omega^2$ of Formulas (2) and (3).

Figure 5:
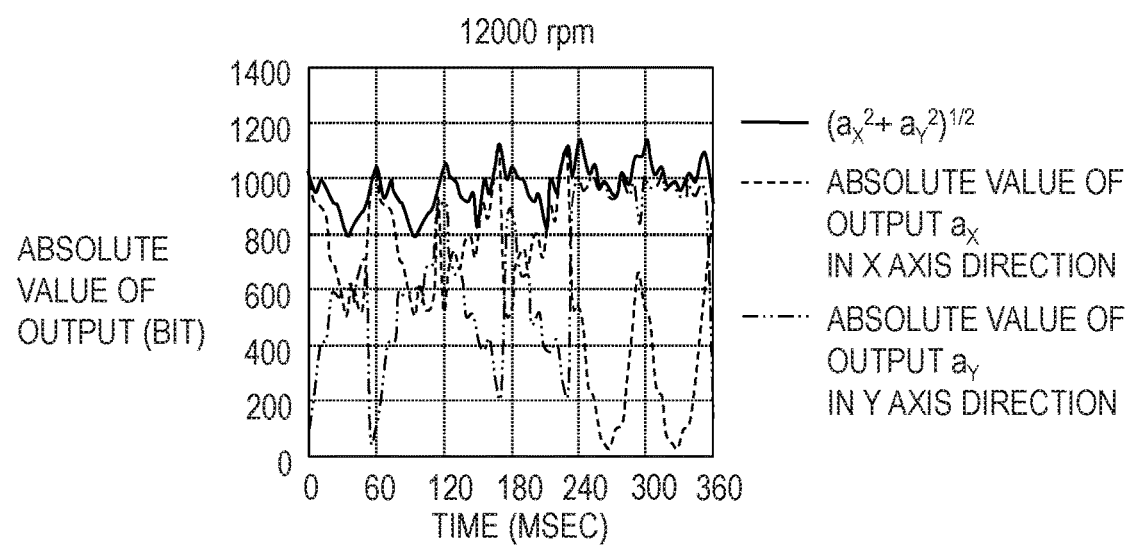
FIG. 5 is a diagram illustrating an example in which a rotor is rotated at 12000 rpm and values indicating acceleration generated by vibration are measured at intervals of 5 msec.

FIG. 5 illustrates an example in which a rotor is rotated at 12000 rpm and values indicating acceleration generated by vibration are measured at intervals of 5 msec. In this example, the vertical axis indicates an absolute value of the number of bits of a digital signal which is an output of an acceleration sensor. Further, measured points are omitted and only lines obtained by connecting measured points are illustrated. FIG. 5 also illustrates a value of $(a_X^2 + a_Y^2)^{1/2}$ by a solid line. In the case of the rotation at 12000 rpm, acceleration generated by vibration cannot be reproduced unless measurement is performed at intervals of 2.5 msec or less. Therefore, an absolute value $|a_X|$, which is indicated by the dotted line, of an output in the X axis direction (a value indicating acceleration in the X axis direction) and an absolute value $|a_Y|$, which is indicated by the two-dot chain line, of an output in the Y axis direction (a value indicating acceleration in the Y axis direction) do not have waveforms indicating absolute values of sine wave. Accordingly, it is hard to obtain the value corresponding to $R\omega^2$ of Formulas (2) and (3) only by one of the values $a_X$ and $a_Y$ indicating acceleration. On the other hand, a value of $(a_X^2 + a_Y^2)^{1/2}$ constantly remains at approximately 800 to 1100 and can be presumed to be close to the value corresponding to $R\omega^2$ of Formulas (2) and (3).

From the theoretical point of view, $$(a_X^2 + a_Y^2)^{1/2} = R\omega^2 (\sin^2 \omega t + (\pm \cos \omega t)^2)^{1/2} \quad (4)$$
$$= R\omega^2$$

is obtained from Formulas (2) and (3). That is, the value corresponding to the acceleration $R\omega^2$ can be theoretically obtained by using the values $a_X$ and $a_Y$ indicating acceleration in two directions which are mutually orthogonal on a plane which is perpendicular to the rotating shaft and Formula (4). Accordingly, the value corresponding to the acceleration $R\omega^2$ can be obtained even without increasing a sampling frequency and raising a processing speed of the control unit 150. Here, the "value corresponding to acceleration" is a value obtained by eliminating a component of time t and may be a value which monotonically increases or monotonically decreases when the acceleration increases, even without being proportional to the acceleration. Details will be provided in the second modification.

Figure 6:
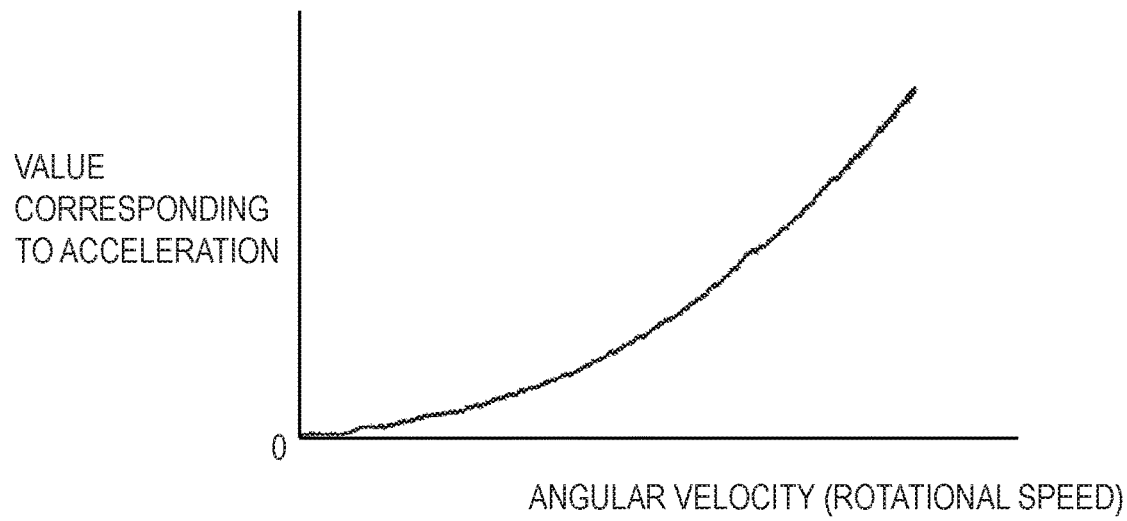
FIG. 6 is a diagram illustrating an image obtained by obtaining and plotting acceleration corresponding values while changing an angular velocity (rotational speed) with a centrifuge, in which the balance of a rotor is imbalanced to an upper limit of an allowable range.
Figure 7:
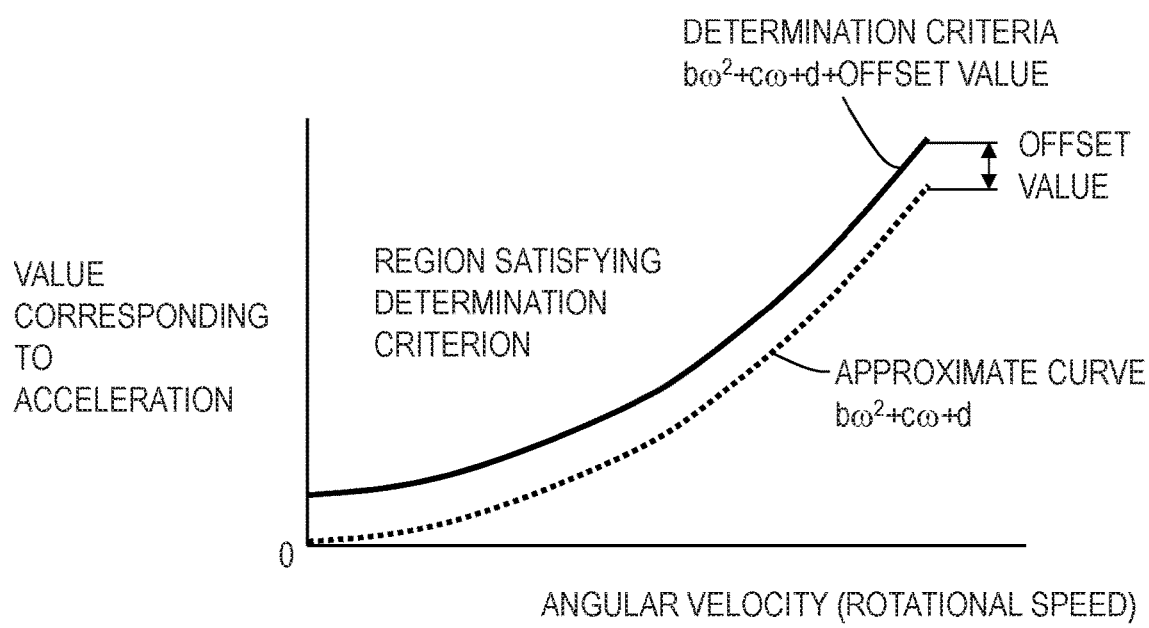
FIG. 7 is a diagram illustrating a quadratic curve ($b\omega^2 + c\omega + d$) obtained by approximating the line in FIG. 6 and an example of a determination criterion obtained by adding an offset value to the quadratic curve.

FIG. 6 illustrates an image obtained by obtaining and plotting values corresponding to acceleration while changing an angular velocity (rotational speed) with a centrifuge, in which the balance of a rotor is imbalanced to the upper limit of an allowable range. The horizontal axis indicates the angular velocity (rotational speed) and the vertical axis indicates the value corresponding to acceleration. FIG. 7 illustrates a quadratic curve ($b\omega^2+c\omega+d$) obtained by approximating the line in FIG. 6 and an example of a determination criterion obtained by adding an offset value to the quadratic curve. The approximate curve is indicated by a dotted line and the determination criterion is indicated by a solid line. A part above the curve indicating the determination criterion is a region satisfying the determination criterion.

Figure 8:
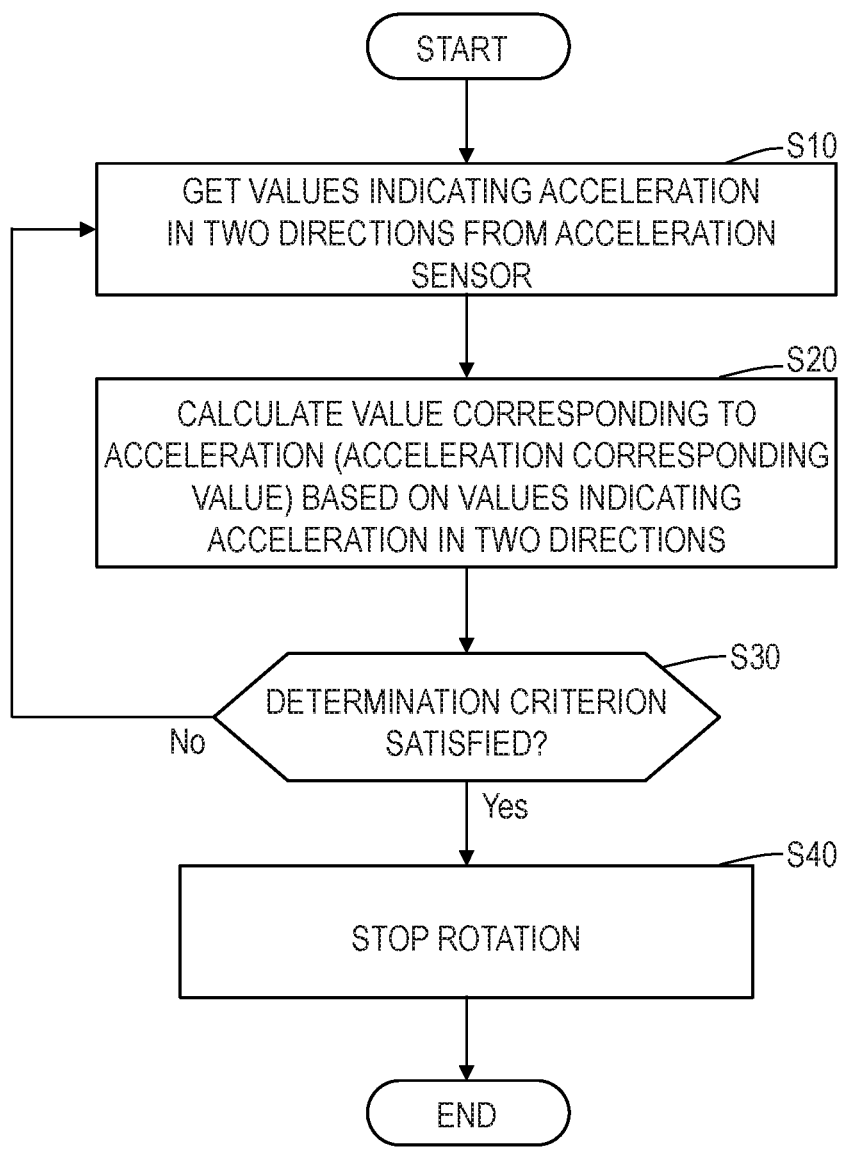
FIG. 8 is a diagram illustrating a processing flow of the control unit 150.

FIG. 8 illustrates a processing flow of the control unit 150. The control unit 150 gets values indicating acceleration in two different directions (S10). The control unit 150 obtains an acceleration corresponding value, which is a value corresponding to acceleration in a direction perpendicular to the axial direction of the rotating shaft 130, based on the values indicating acceleration in the two different directions (S20) and confirms whether or not the acceleration corresponding value satisfies a determination criterion which is predetermined and indicates that acceleration is large (S30). In the case where the determination criterion is not satisfied, the processing returns to step S10. In the case where the determination criterion is satisfied, rotation of the rotor 110 is stopped (S40).

More specifically, the control unit 150 preliminarily records constant values b, c, d+offset value in the first embodiment. Then, the control unit 150 gets values $a_X$ and $a_Y$ indicating acceleration in two different directions (S10) and obtains $(a_X^2+a_Y^2)^{1/2}$ as an acceleration corresponding value (the value $R\omega^2$ corresponding to acceleration in the direction perpendicular to the axial direction of the rotating shaft 130) (S20). The acceleration corresponding value $(a_X^2+a_Y^2)^{1/2}$ is compared with the determination criterion $b\omega^2+c\omega+d+$offset value (S30), and rotation of the rotor 110 is stopped when the acceleration corresponding value exceeds the determination criterion (S40).

According to the centrifuge 100 of the first embodiment, since it is not necessary to set the sampling frequency of the acceleration sensor 140 in accordance with the sampling theorem, the sampling frequency can be set to a low frequency. Accordingly, in selection of the acceleration sensor 140, the selection can be made with more emphasis on accuracy than capability of performing sampling at high frequency. Consequently, acceleration caused by imbalance in the balance of a rotor can be accurately measured irrespective of the velocity of rotation of the rotor. Further, necessity for taking into account malfunction caused by inferior measurement accuracy is low in setting of a determination criterion. In addition, since the processing of the control unit 150 does not need to be speeded up, an inexpensive CPU or the like can be easily used.

[First Modification]

In the first embodiment, the two different directions are set to be the X axis direction and the Y axis direction which are perpendicular to each other. In the present invention, though it is considered that it is desirable to set two different directions to be perpendicular to each other as the first embodiment, a generalized example will be described in this modification. The configuration of the centrifuge is same as that in FIGS. 1 and 2.

Values indicating acceleration of two different directions outputted by the acceleration sensor 140 are set to $a_1$ and $a_2$ respectively, and it is assumed that the value $a_1$ is delayed from the value $a_X$ indicating acceleration in the X axis direction by the phase $\theta_1$ and the value $a_2$ is delayed from the value $a_X$ indicating acceleration in the X axis direction by the phase $\theta_2$. Here, the value $a_X$ indicating acceleration in the X axis direction is set to $R\omega^2 \cos \omega t$ and the value $a_Y$ indicating acceleration in the Y axis direction is set to $R\omega^2 \sin \omega t$. In this case, $a_1$ and $a_2$ can be expressed by the following formulas respectively.

$$a_1 = R\omega^2\cos(\omega t - \theta_1) \hspace{2em} (5)$$
$$= R\omega^2(\cos\omega t \cdot \cos\theta_1 + \sin\omega t \cdot \sin\theta_1)$$

$$a_2 = R\omega^2\cos(\omega t - \theta_2) \hspace{2em} (6)$$
$$= R\omega^2(\cos\omega t \cdot \cos\theta_2 + \sin\omega t \cdot \sin\theta_2)$$

From Formulas (5) and (6), $a_X$ and $a_Y$ can be obtained as follows.

$$a_X = -(a_1 \sin \theta_2 - a_2 \sin \theta_1)/\sin(\theta_1-\theta_2) \hspace{2em} (7)$$

$$a_Y = (a_1 \cos \theta_2 - a_2 \cos \theta_1)/\sin(\theta_1-\theta_2) \hspace{2em} (8)$$

If the values $a_X$ and $a_Y$ respectively indicating acceleration in the X axis direction and the Y axis direction are thus obtained based on the values $a_1$ and $a_2$, following processing of the control unit 150 can be made same as that in the first embodiment. Alternatively, even without obtaining the values $a_X$ and $a_Y$ themselves, $(a_X^2+a_Y^2)^{1/2}$ may be obtained as $$(a_X^2+a_Y^2)^{1/2}=((a_1 \sin \theta_2 - a_2 \sin \theta_1)^2+(a_1 \cos \theta_2 - a_2 \cos \theta_1)^2)^{1/2}/|\sin(\theta_1-\theta_2)| \hspace{2em} (9).$$

That is, it is sufficient that the acceleration sensor 140 is capable of outputting at least values indicating acceleration in two different directions perpendicular to the axial direction of the rotating shaft 130. Here, the "different directions" do not include directions which are parallel to each other and are reversed to each other.

Thus, the control unit 150 is capable of obtaining a value based on $a_X^2+a_Y^2$ from the value $a_1$ and the value $a_2$ also in the case where values indicating acceleration in two different directions are not $a_X$ and $a_Y$. Accordingly, similar advantageous effects to those in the first embodiment can be obtained also in the first modification.

[Second Modification]

In the present modification, a modification example of an acceleration corresponding value (a value corresponding to acceleration in the direction perpendicular to the axial direction of the rotating shaft 130) after obtaining the values $a_X$ and $a_Y$ indicating acceleration in two directions, which are perpendicular to the axial direction of the rotating shaft 130 and orthogonal to each other and a modification example of a determination criterion will be described. The configuration of the centrifuge is same as that in FIGS. 1 and 2.

In Formula (4), since time t is eliminated by using a property of $$\sin^2\omega t + (\pm\cos \omega t)^2 = 1 \hspace{2em} (10),$$

a value corresponding to acceleration can be obtained also in high-speed rotation even with a low sampling frequency. Accordingly, if an acceleration corresponding value is set to a value based on $a_X^2+a_Y^2$ even without setting the acceleration corresponding value to $(a_X^2+a_Y^2)^{1/2}$, a value independent of time t can be obtained. The "value based on $a_X^2+a_Y^2$" includes $a_X^2+a_Y^2$ itself, a value obtained by raising $a_X^2+a_Y^2$ to the ½th power, a constant multiple of $a_X^2+a_Y^2$, and the like, but the "value based on $a_X^2+a_Y^2$" is not limited to these values For example, in the case where $a_X^2+a_Y^2$ is set to the acceleration corresponding value, $$a_X^2+a_Y^2=R^2\omega^4 \tag{11}$$

is obtained. Therefore, for example, the control unit 150 may set a quartic curve ($b\omega^4+c\omega^2+d$ or $b\omega^4+c\omega^3+d\omega^2+e\omega+f$) and a determination criterion obtained by adding an offset value to the quartic curve, and may stop rotation of the rotor 110 when the acceleration corresponding value exceeds the determination criterion. When the acceleration corresponding value is set to $a_X^2+a_Y^2$ itself, calculation of the ½ power is not performed, so that the processing of the control unit 150 is simplified when compared to the first embodiment. Further, without setting the determination criterion as a curve, a range of the angular velocity may be divided into a plurality of ranges and threshold values set for respective angular velocity ranges may be used as the determination criterion.

Further, for example, when a value obtained by raising $a_X^2+a_Y^2$ to the ¼th power is set as the acceleration corresponding value, $$(a_X^2+a_Y^2)^{1/4}=R^{1/2}\omega \tag{12}$$

is obtained. Therefore, for example, the control unit 150 may set a straight line ($b\omega+d$) and a determination criterion obtained by adding an offset value to the straight line, and may stop rotation of the rotor 110 when the acceleration corresponding value exceeds the determination criterion. In this case, the judgement criterion can be simplified.

Thus, the "value corresponding to acceleration" is a value obtained by eliminating a component of time t and may be a value which monotonically increases or monotonically decreases when the acceleration increases. In addition, if the acceleration corresponding value is set to a value based on $a_X^2+a_Y^2$, similar advantageous effects to those of the first embodiment can be obtained. Here, there is the case where an effect for reducing the calculation amount and an effect for simplifying a judgement criterion can be obtained depending on setting of the value based on $a_X^2+a_Y^2$ as described above.

DESCRIPTION OF REFERENCE NUMERALS

100 centrifuge
110 rotor
120 drive source
130 rotating shaft
140 acceleration sensor
150 control unit
160 vibration isolation unit
161 support plate
162 vibration isolation spring
190 casing
191 chamber lid
192 chamber

What is claimed is:

1. A centrifuge that includes a rotor, a drive source for rotating the rotor, and a rotating shaft for coupling the rotor and the drive source, the centrifuge comprising:
   an acceleration sensor that outputs values indicating acceleration in two different directions which are perpendicular to an axial direction of the rotating shaft; and
   a controller that obtains an acceleration corresponding value and stops rotation of the rotor in a case where the acceleration corresponding value satisfies a determination criteria which is predetermined and indicates that acceleration is large, wherein:
   values indicating acceleration in the two different directions are set to $a_1$ and $a_2$ respectively,
   values indicating acceleration in two directions, the two directions being perpendicular to the axial direction of the rotating shaft and orthogonal to each other, are set to $a_X$ and $a_Y$ respectively, and
   the controller obtains the acceleration corresponding value from the value $a_1$ and the value $a_2$ so that the acceleration corresponding value is a value based on $a_X^2+a_Y^2$.

2. A centrifuge that includes a rotor, a drive source for rotating the rotor, and a rotating shaft for coupling the rotor and the drive source, the centrifuge comprising:
   an acceleration sensor that outputs values indicating acceleration in two different directions which are perpendicular to an axial direction of the rotating shaft; and
   a controller that obtains an acceleration corresponding value and stops rotation of the rotor in a case where the acceleration corresponding value satisfies a determination criteria which is predetermined and indicates that acceleration is large, wherein:
   the two different directions are directions which are perpendicular to each other,
   when values indicating acceleration in the two different directions are set to $a_X$ and $a_Y$ respectively, the acceleration corresponding value is set to a value based on $a_X^2+a_Y^2$.

3. The centrifuge according to claim 1, wherein the acceleration corresponding value is set to a value which is proportional to $(a_X^2+a_Y^2)^{1/2}$.

4. The centrifuge according to claim 3, wherein
   the determination criterion is determined to be satisfied when the acceleration corresponding value exceeds a criterion expressed by a quadratic function of an angular velocity of the rotating shaft.

5. The centrifuge according to claim 2, wherein the acceleration corresponding value is set to a value which is proportional to $(a_X^2+a_Y^2)^{1/2}$.

6. The centrifuge according to claim 5, wherein
   the determination criterion is determined to be satisfied when the acceleration corresponding value exceeds a criterion expressed by a quadratic function of an angular velocity of the rotating shaft.

* * * * *